United States Patent [19]

Brackman, Jr. et al.

[11] Patent Number: 4,507,723

[45] Date of Patent: Mar. 26, 1985

[54] METHOD FOR ADAPTIVE CONTROL IN A POWER CONVERTER OPERATING IN A DISCONTINUOUS CURRENT MODE

[75] Inventors: William D. Brackman, Jr., Salem; John D. D'Atre, Charlottesville; Loren H. Walker, Salem, all of Va.

[73] Assignee: General Electric Company, Salem, Va.

[21] Appl. No.: 458,108

[22] Filed: Jan. 14, 1983

[51] Int. Cl.$^3$ ............................................. H02M 7/155
[52] U.S. Cl. .................................. 363/87; 318/345 E; 363/129; 364/148
[58] Field of Search ........................... 363/81, 87, 129; 318/345 E, 672; 364/148

[56] References Cited

U.S. PATENT DOCUMENTS

| | | | |
|---|---|---|---|
| 3,902,109 | 8/1975 | Speth et al. | 363/87 |
| 4,090,116 | 5/1978 | Lippitt | 318/345 E |
| 4,249,236 | 2/1981 | Omae et al. | 363/87 |

FOREIGN PATENT DOCUMENTS

| | | | |
|---|---|---|---|
| 2344330 | 7/1975 | Fed. Rep. of Germany | 363/87 |
| 3213057 | 4/1982 | Fed. Rep. of Germany | |
| 56162974 | 5/1982 | Japan | |
| 858201 | 8/1981 | U.S.S.R. | 363/81 |

OTHER PUBLICATIONS

"Thyristor Phase-Controlled Converters and Cycloconverters" by B. R. Pelley-Wiley-Interscience, Copyright 1971.

*Primary Examiner*—William H. Beha, Jr.
*Attorney, Agent, or Firm*—Arnold E. Renner

[57] ABSTRACT

A method of adaptively controlling the time of rendering the individual controlled devices of a controllable power conversion bridge includes the sensing of the instant in time at which the current from the bridge to a load becomes discontinuous. From the time of this sensing, the time period to a predetermined time such as a normally calculated time of rendering the controlled devices conductive is derived. This time period is then multiplied by a multiplier and the resultant product is combined with the predetermined time to provide an actual time of rendering the controlled devices conductive.

10 Claims, 3 Drawing Figures

METHOD FOR ADAPTIVE CONTROL IN A POWER CONVERTER OPERATING IN A DISCONTINUOUS CURRENT MODE

BACKGROUND OF THE INVENTION

The present invention relates generally to power conversion apparatus and more particularly to a method of developing a linear relationship between the load voltage of a controlled converter bridge and a command which determines that load voltage.

It is common practice in the discipline of power conversion to use a bridge arrangement of controllable devices, such as thyristors or transistors, to provide an output voltage of controllable magnitude and/or frequency. Such bridge arrangements are most commonly used to convert alternating current (AC) electrical power to direct current (DC) electrical power or DC power to AC power, although similar arrangements for AC to AC and DC to DC are also known. In these converters, the several controllable elements are sequentially rendered conductive in some predetermined order to effect the desired output of the converter.

Perhaps the most common form of converter in use today, at least in the higher power fields, is the thyristor bridge converter. Employing well known phase control techniques, thyristor converters are able to provide electrical power outputs of controllable magnitude and/or frequency. An ideal control for such a converter would be one which causes the load voltage to be linearly proportional to a command voltage. One problem associated with these bridge converters, as well as some other types, is that they tend to exhibit a non-linear relationship between their load voltage and the command (a command voltage or reference).

The most common technique in use today for adjusting for this non-linearity is through the use of "biased cosine" firing logic, an example for which is described in Chapter 10 of *Thyristor Phase-Controlled Converters and Cycloconverters* by Brian R. Pelly - Wiley Interscience, Copyright 1971, Library of Congress Catalog Card Number 70-125276 which publication is specifically incorporated hereinto by reference. This biased cosine firing technique, although not one hundred percent effective performs adequately for most purposes so long as the converter output current remains continuous. It has been found, however, that when the current becomes discontinuous, the non-linearity between the load voltage and the command voltage or reference substantially increases.

SUMMARY OF THE INVENTION

It is, therefore, an object of the present invention to provide an improved method for enhancing the linear relationship between the load voltage of a controlled converter bridge and the applied command by adjusting the time of rendering the controlled elements of the bridge conductive.

It is a further object to provide a method for correcting for differences in the conduction angle of the controlled elements of a control rectifier bridge which method is suitable for a computer type application.

It is another object to provide an improved method for enhancing the linear relationship between the load voltage of a controlled converter bridge and the command voltage or reference when said bridge converter is operating in the discontinuous current mode.

The foregoing and other objects are achieved, in accordance with the present invention, by the method of first sensing the time at which the load current becomes discontinuous and, in response to that sensing of time, determining the time period between that time and a predetermined time (e.g., a normally calculated time for rendering of the next said controlled device conductive based upon a presumption of continuous current from the converter) which is not later than the time of rendering the next controlled device conductive. This time period is multiplied by a predetermined multiplier determined by parameters of the converter bridge and the load to give a time interval which is utilized to develop a time for the actual firing of the controlled devices within the bridge.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

DETAILED DESCRIPTION

Figure 1:
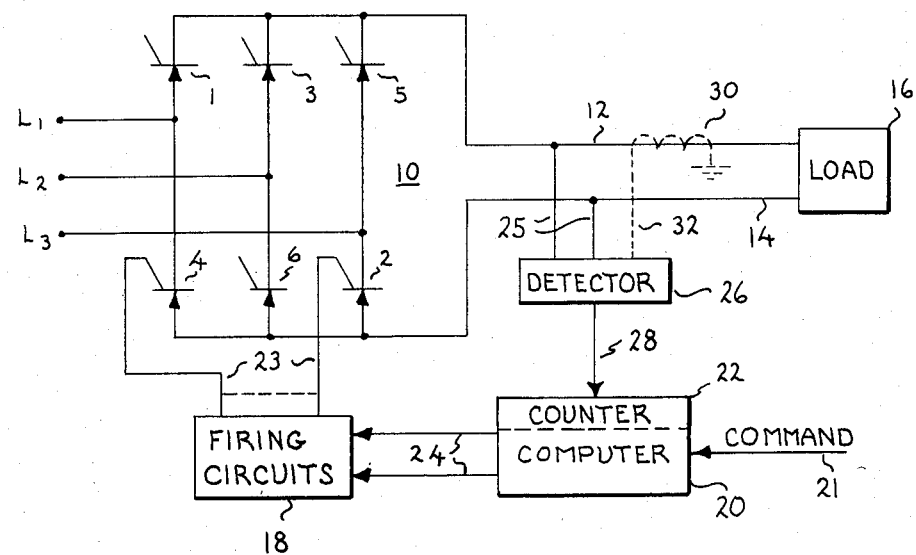
FIG. 1 is a schematic block diagram illustrating a typical environment for application of the method of the present invention.

Referring now to FIG. 1, there is shown in schematic form a suitable environment for employing the present invention. As illustrated, a six-pulse AC to DC converter 10, including six thyristors 1 through 6, receives three phase AC power from a source illustrated by the three lines $L_1$, $L_2$ and $L_3$. The order of firing or rendering conductive of the several thyristors in the bridge is in the sequence of their numbering as shown. A DC output is provided by the bridge on conductors 12 and 14 to a suitable load 16, for example, a DC motor. The actual firing or rendering conductive of the several thyristors of the bridge 10 is from firing circuits 18 by way of suitable conductors to the gate electrodes of the thyristors 1 through 6 as illustrated by lines 23. In FIG. 1, only two such lines to the gating electrodes have been shown for sake of simplicity, it being expressly understood each of the gate electrodes would be similarly connected.

As illustrated, the actual output of the firing circuits 18 is under the control of a suitable computer 20 which may be, for example, an Intel 8085 which includes, for purposes to be discussed later, a counter 22. Computer 20, responds to an input command signal on line 21 in accordance with a pre-established program; e.g., the biased cosine method as described in the forementioned publication by Pelly, and serves to compute the appropriate firing angles for the thyristors of the bridge 10 as modified in accordance with the present invention. A typical computer controlled implementation is described in U.S. Pat. No. 4,090,116, "Closed Loop Digital Control System and Method for Motor Control", by D. L. Lippitt issued May 16, 1978, which patent is specifically incorporated hereinto by reference. The signal path from the computer 20 to firing circuits 18 is illustrated by lines 24.

In order to implement the adaptive control of the subject invention, there is provided some means to determine when the current from the bridge 10 to the load 16 (the load current) becomes discontinuous. In this regard there is shown, in full line form, a detector 26 which is connected across the conductors 12 and 14 by way of lines 25. Detector 26 will provide an output signal by way of line 28 to the computer 20 and more particularly to the counter 22 of that computer in order to initiate a beginning of a count. Preferably, detector 26 is that which is shown and described in co-pending application Ser. No. 458,109, "Commutation Detector Scheme" by William D. Brackman, Jr., (which is assigned to the assignee of the present invention), filed on Jan. 14, 1983. Other forms of detecting discontinuous current, however, may be used. As another example, in FIG. 1 there is shown in phantom form, a current transformer 30 which is connected by way of a line 32 to the detector 26. As a further example of detecting discontinuous current, the voltage across each of the several thyristors 1 through 6 of the bridge 10 could be monitored to determine when each of the voltages is high to thus determine that the bridge is not conducting and hence the current is discontinuous. The primary function to be achieved is to determine a discontinuous current to provide an output signal via line 28 to the counter portion 22 of the computer 20 to initiate a count for reasons which will be explained.

Figure 2:
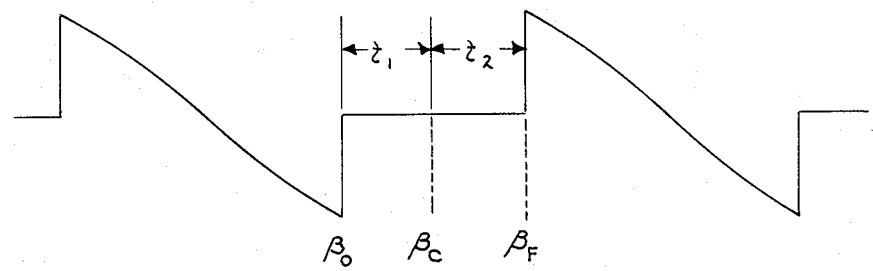
FIG. 2 shows a voltage wave shape helpful in understanding the present invention; and, FIG. 3 is a flow diagram describing the method of the present invention.

With the foregoing in mind, prior to discussing the method of the present invention, it is advisable to reference FIG. 2 which illustrates a typical load voltage wave shape such as might be provided by the converter 10 of FIG. 1 with a firing angle of approximately 100 degrees following the crossings of the phase voltages of the source $L_1$, $L_2$ and $L_3$ of the zero axis.

Three points in time and two time periods are pertinent to this discussion. Time $\beta_O$ represents the point in time at which the current actually becomes discontinuous (goes to zero) as would be determined by the detector 26 (FIG. 1). $\beta_F$ represents the actual firing time in accordance with the practice of the present invention. Time $\beta_C$ represents some predetermined time between $\beta_O$ and $\beta_F$ for determining a time interval for the practice of the method of the present invention. In accordance with the specific preferred embodiment, $\beta_C$ represents that time at which the normal biased cosine type of firing control would calculate as an appropriate time to render the next thyristor conductive based upon an assumption of continuous current. This is in accordance with the aforementioned publication by Pelly. As illustrated, $t_1$ is the period of time between $\beta_O$ and $\beta_C$, while $t_2$ is the time interval between $\beta_C$ and $\beta_F$. Thus, in accordance with the present embodiment as will be discussed in detail with respect to FIG. 3, the $\beta_O$ time is sensed to initiate operation of counter 22 (FIG. 2) and the time period $t_1$ is then determined from the count in counter 22 at time $\beta_C$. Interval $t_2$ is then calculated using period $t_1$ and $t_2$ is then added to time $\beta_C$ to define the time for the actual firing of the thyristors; i.e., time $\beta_F$, is determined.

Figure 3:
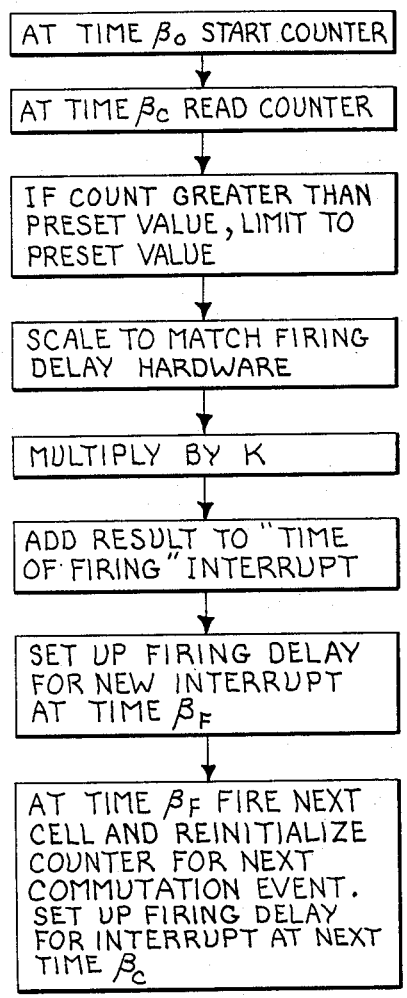

Referencing now FIG. 3, in conjunction with the previously discussed FIGS. 1 and 2, it is seen that, in accordance with the method of the present embodiment, at time $\beta_O$ there is provided an output signal from detector 26 via line 28 such as to start counter 22 of computer 20. At time $\beta_C$, the count contained in counter 22 is read. Since the adaptive control of the present invention is, like any adaptive control, subject to certain limitations, if the count in the counter is greater than some preset value, that preset value is used. The count thus achieved, representing time period $t_1$, is then scaled to properly correspond to the firing delay hardware of the biased cosine computation. This firing delay hardware could include, for example, counter 224 as shown in the aforementioned U.S. Pat. No. 4,090,116.

The next step in the present embodiment is to calculate the time interval $t_2$. This is done in accordance with the relationship; $t_2 = K \cdot t_1$, wherein K is a constant for the given application and related to the load time constant and the configuration of the overall system. In accordance with this preferred embodiment of the present invention, the constant K is defined by the expression:

$$K = (1 - e^{-kN\omega t_M})$$

wherein:
e = 2.71828
k = constant, usually less than unity,
N = number of active bridge semiconductors (six as shown in FIG. 1)
$\omega$ = power source frequency in radians
$t_M$ = load time constant (e.g., the RL time constant of the load).

After $t_2$ is computed, that time interval is added to the $\beta_C$ time to generate or develop, within computer 20, the new firing time $\beta_F$. This $\beta_F$ time is then set up in the firing delay hardware for firing the thyristors of the bridge 10 to thus provide a new firing time. At time $\beta_F$ when the next controlled device is fired, the counter is initialized; i.e., is set to zero or whatever preset value is being used in anticipation of the next commutation event. This subroutine will then be repeated for each firing of the several devices of the bridge 10. The actual program for implementing the subroutine as illustrated by FIG. 3 is shown in Appendix A which is attached to and forms a part of this specification.

It is also possible that a new value of $\beta_F$ (i.e., $\beta_F'$) may be updated for intermediate values of $\beta_C$ ($\beta_C'$) which are repeatedly updated until the time of $\beta_F$. This may be done in accordance with the formula in the form of:

$$\beta_F' = (t_1 + (\beta_C' - \beta_C))K + \beta_C'.$$

Such an adaptive update in accordance with the above formula for the new calculation $\beta_F'$ will provide minimum transportation delay and thus maximum response. A less precise updating technique would be to retain the value of $t_2$ and sum that retained value with the latest $\beta_C$ value ($\beta_C'$) in accordance with the relationship:
$\beta_F' = t_2 + \beta_C'.$ From the foregoing, it is seen that there has been provided a system which is easily implemented and will greatly enhance linearity between the load voltage of a converter bridge and the command voltage or reference when the current becomes discontinuous for any reason.

While there has been shown and described what is at present considered to be the preferred embodiment of the present invention, modifications thereto will readily occur to those skilled in the art. For example, while the specific preferred embodiment utilized the normally calculated firing time to define $\beta_C$, $\beta_C$ could be defined by other methods such as a fixed period of time (e.g., 60 electrical degrees) after the firing of the most recently fired controlled device. It is not desired, therefore, that the invention be limited to that specifically shown and described and it is intended to cover in the appended

APPENDIX A

```
402                        ADAPT
403
404                        ADAPT TO CONDUCTION ANGLE.    ELSE
405 003E 3A 00 00   E      LDA U3CNTO                   READ EXTINCTION ANGLE COUNTER
406 0041 FE D3             CPI 0D3H
407 0043 D2 48 00   C      JNC CNTOK                    IF COUNT < D3H, THEN
408                 ADPTO
409 0046 3E D3             MVI A, 0D3H                  SUBSTITUTE D3H
410                 CNTOK                               ENDIF
411 0048 2F                CMA                          CHANGE SIGN
412 0049 A7                ANA A                        SCALE TO MATCH PLLCMP
413 004A 1F                RAR
414 004B A7                ANA                          MULTIPLY BY GAIN OF 0.75
415 004C 1F                RAR
416 004D 5F                MOV E,A
417 004E A7                ANA A
418 004F 1F                RAR
419 0050 8B                ADC E
420 0051 5F                MOV E,A
421 0052 32 00 00   E      STA TMZERO                   UPDATE TMZERO TO ACTUAL VALUE
422 0055 FE 01             CPI 1
423 0057 DA 84 00   C      JC OKFIR                     IF TMZERO <1 , GOTO OKFIR
424 005A 16 00             MVI D,00H
425                                                     END IF
426 005C 2A 0000    E      LHLD TTFIR                   ADD TO "TIME TO FIRE"
427 005F 19                DAD D
428                                                     IF RESULT > 360 DEG, THEN
429 0060 EB                XCHG
430 0061 21 80 FE          LXI H,0FE80H                 1FE80H = −360 DEG
431 0064 19                DAD D
432 0065 DA 69 00   C      JC ADPT1
433 0068 EB                XCHG                         SUBTRACT 360 DEG
434                 ADPT1                               ENDIF
435 0069 22 00 00   E      SHLD PLLCMP                  SET UP ADJUSTED PLLCMP VALUE
436
437 006C 3A 00 00   E      LDA TMZERO
438 006F FE 02             CPI 2                        ELSE IF TMZERO < 2, THEN
439 0071 DA 84 00   C      JC OKFIR                     GOTO OKFIR
440 0074 FE 03             CPI 3                        ELSE IF TMZERO >= 3, THEN
441 0076 D2 E8 01   C      JNC CKLATE                   GOTO CKLATE
442                        REPT 8                       ELSE
443                        XTHL                         DELAY ONE DEGREE
444                        ENDM
453 0081 C3 84 00   C      JMP OKFIR                    GOTO OKFIR
454                                                     END ENDIF
```

What is claimed is:

1. For use in conjunction with a phase controlled power conversion bridge employing controlled devices for supplying electrical current to a load, a method for improving the linear relationship between the load voltage of the bridge and a command for determining the load voltage comprising:
   (a) sensing the time at which the load current becomes discontinuous;
   (b) determining a time period between the time the current becomes discontinuous and a predetermined time, not later than the time of rendering the next controlled device of the bridge conductive; and,
   (c) determining an actual time for rendering the next controlled device conductive as a function of the predetermined time and said time period.

2. The invention in accordance with claim 1 wherein the step of determining said actual time includes the steps of:
   (a) calculating a time interval based upon said time period; and,
   (b) combining said time interval with said predetermined time to determine said actual time.

3. The invention in accordance with claim 1 wherein said bridge provides a direct current output voltage.

4. For use in conjunction with a phase controlled power conversion bridge employing controlled devices for supplying electrical current to a load, a method for improving the linear relationship between the load voltage of the bridge and a command for determining the load voltage comprising:
   (a) sensing the time at which the load current becomes discontinuous;
   (b) determining a time period between the time the current becomes discontinuous and a normally calculated time for rendering the next controlled device conductive based upon a presumption of continuous current from the bridge to the load;
   (c) calculating a time interval based upon said time period and a multiplier defined by predetermined parameters of the bridge and the load; and,
   (d) determining an actual time for rendering the next controlled device conductive as a function of the normally calculated time and said time interval.

5. The invention in accordance with claim 4 wherein said controlled devices are thyristors.

6. The invention in accordance with claim 4 wherein said time interval is defined as $t_2$ and is determined by the expression:

$$t_2 = K \cdot t_1;$$

wherein,
   $t_1 =$ said time period, and
   $K = (1 - e^{-kN\omega tM})$; in which, $e = 2.71828$
$k$ = constant
$N$ = number of active bridge devices
$\omega$ = power source frequency
$t_M$ = load time constant.

7. The invention in accordance with claim 4 wherein the actual time for rendering the next controlled device conductive is determined by adding said time interval to the normally calculated time.

8. The invention in accordance with claim 6 wherein the actual time for rendering the next controlled device conductive is determined by adding the time interval $t_2$ to the normally calculated time.

9. The invention in accordance with claim 6 wherein the normally calculated time $(\beta_C)$ is repeatedly updated $(\beta_C')$ until time $\beta_F$ to update said actual time $(\beta_F')$ in accordance with the relationship:

$$\beta_F' = t_2 + \beta_C'.$$

10. The invention in accordance with claim 6 wherein the normally calculated time $(\beta_C)$ is repeatedly updated $(\beta_C')$ until time $\beta_F$ to update said actual time $(\beta_F')$ in accordance with the relationship:

$$\beta_F = (t_1 + (\beta_C' - \beta_C))K + \beta_C'.$$

* * * * *